Mar. 13, 1923.
A. R. THOMPSON
1,448,472
FEED DEVICE FOR FRUIT PITTING MACHINES
Filed Nov. 20, 1922
2 sheets-sheet 1
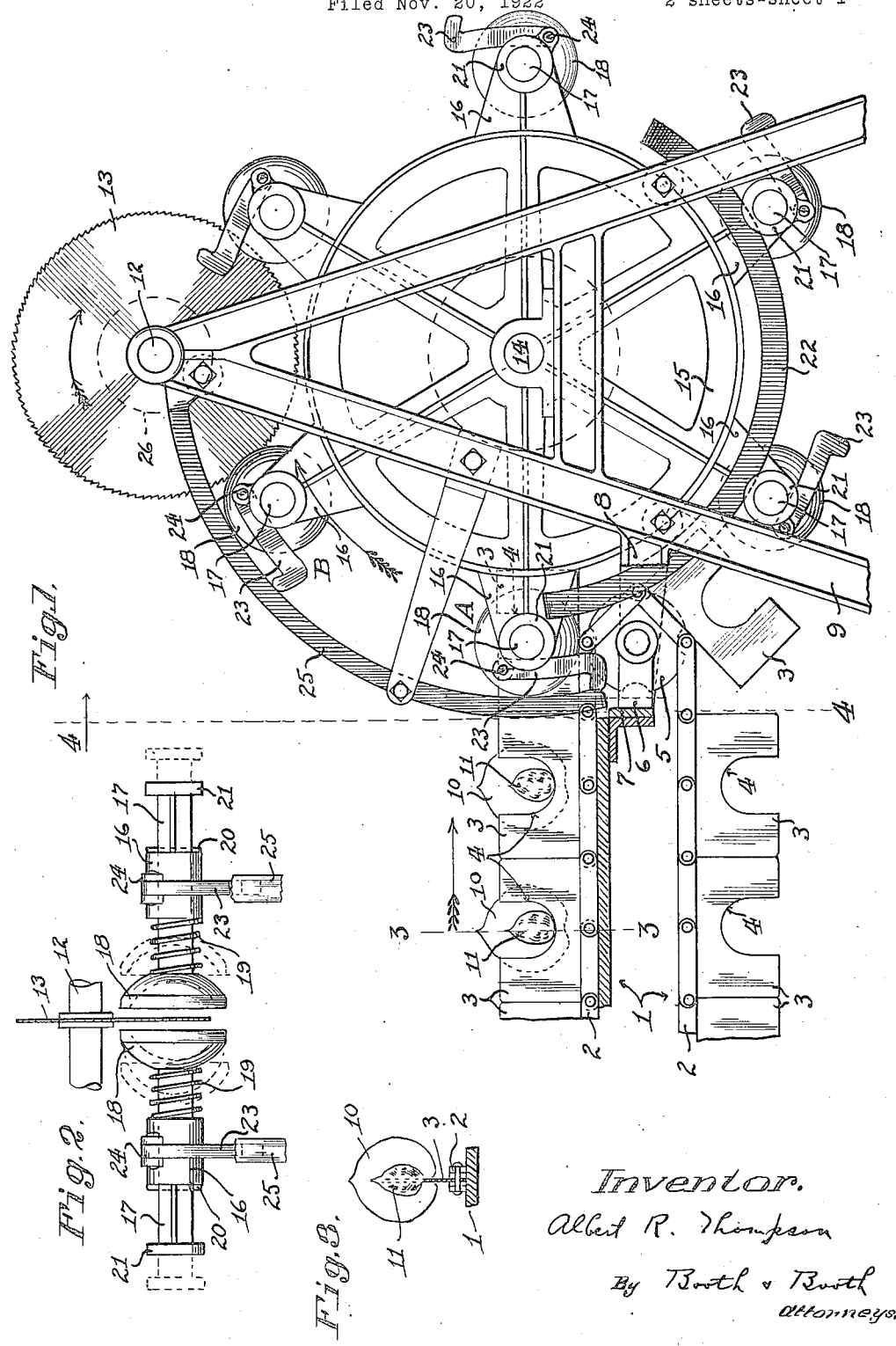
Inventor.
Albert R. Thompson
By Booth & Booth
Attorneys.

Patented Mar. 13, 1923.

1,448,472

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

FEED DEVICE FOR FRUIT-PITTING MACHINES.

Application filed November 20, 1922. Serial No. 602,035.

*To all whom it may concern:*

Be it known that I, ALBERT R. THOMPSON, a citizen of the United States, residing at San Jose, in the county of Santa Clara and State of California, have invented certain new and useful Improvements in Feed Devices for Fruit-Pitting Machines, of which the following is a specification.

My invention relates to fruit pitting machines of the type in which the fruit is cut in its median line, such central cut extending either through the flesh only, or through both flesh and pit, and being preparatory to the removal of the pit.

Such machines are used principally for the pitting of peaches for canning, although they are equally well suited for the pitting of other similar fruits, the fruit being both halved and pitted by the machine. Such fruits commonly have more or less flattened pits, and in order to avoid undue waste in the removal of the pit, as well as for the sake of appearance, the fruit must be cut in the plane of the greatest diameter of the pit. This plane is indicated upon the outside of the fruit by a more or less prominent depression or groove beginning at the stem cavity and extending toward the apex. Some fruits, moreover, are not perfectly symmetrical, the plane of greatest diameter of the pit, as indicated by the exterior groove, lying to one side of the median line of the fruit itself.

The object of my present invention is to provide means for feeding the fruit into a pitting machine of the described type in such a manner that it will be cut accurately in the plane of greatest diameter of the pit, irrespective of whether or not said plane coincides with the true median line of the entire fruit. In other words, the fruit is always halved in the plane of its exterior groove, entirely irrespective of its symmetry or lack of symmetry, thus producing the best possible appearance in the halved fruit, and permitting the removal of the pit with the least possible waste.

For the sake of illustration, my invention will be hereinafter described in connection with a machine of the type in which the fruit is halved before the removal of the pit, the cutting knife or saw passing through both flesh and pit, but it is to be understood that my said invention is equally applicable to any machine in which the fruit is to be halved or cut in the plane either of its exterior groove or of its median line. Moreover, it is to be understood that changes, within the scope of the claims hereto appended, may be made in the form and construction of my device, without departing from the spirit of the invention.

With this in view, my invention will now be fully described with reference to the accompanying drawings, wherein—

Figure 1 is a side elevation of a portion of a fruit pitting machine having my improved feed devices associated therewith, certain parts being shown in section.

Figure 2 is a detailed front elevation of one pair of fruit-holding cups.

Figure 3 is a transverse section of the feed conveyer, taken on the line 3—3 of Fig. 1, showing the position of the fruit thereupon.

Figure 4:
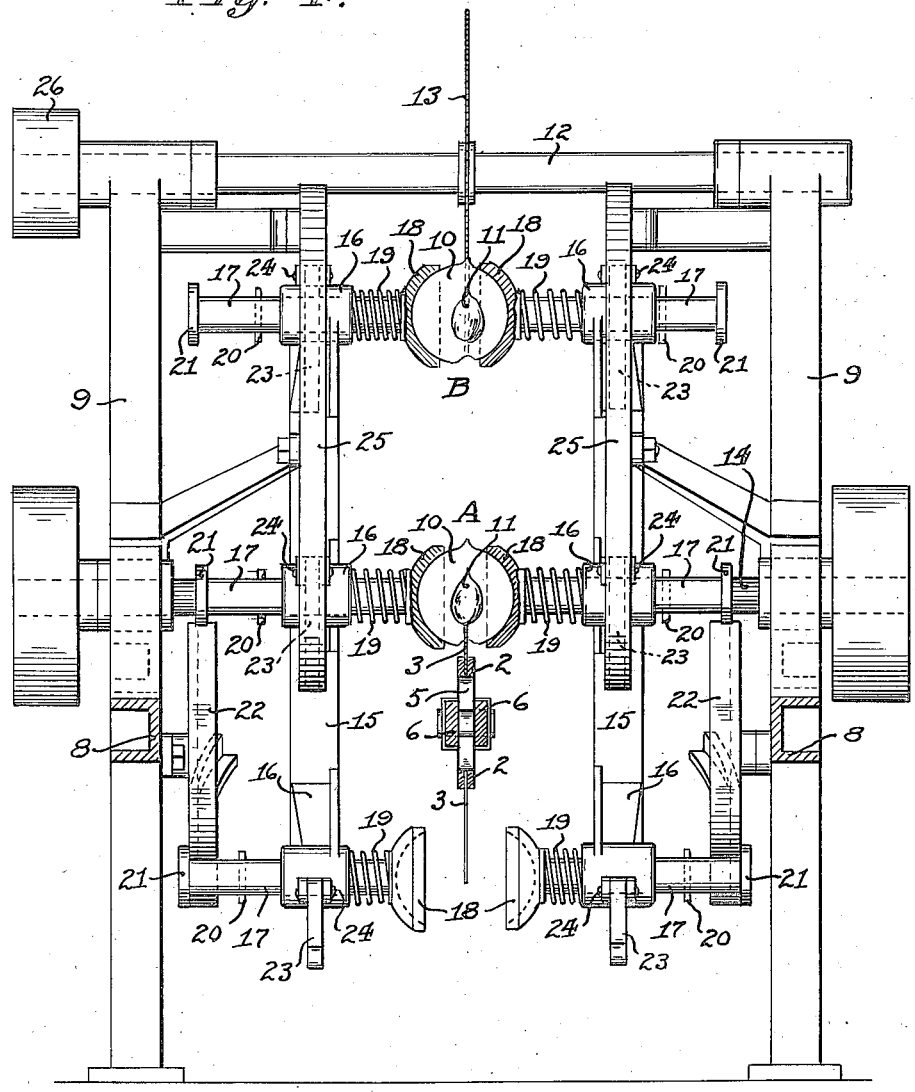
Figure 4 is a part sectional front elevation of the machine, taken mainly on the line 4—4 of Fig. 1 and viewed in the direction of the arrow.

In the drawings, the reference numeral 1 designates a feed conveyer, comprising a chain 2 and a series of aligned vertically positioned blades 3, each having a notch 4 and a sharpened upper edge. Said blades 3 are secured to alternate links of the chain 2, to permit the latter to pass over a sprocket 5, as shown in Fig. 1. Said sprocket 5 is suitably journaled in brackets 6 projecting rearwardly from a cross member 7 which is supported by arms 8, Figs. 1 and 4, extending forwardly from the frame 9 of the machine.

Each conveyer blade 3 is adapted to receive a fruit 10, as shown in Figs. 1 and 3, the flesh of said fruit being forced down over said blade and the pit 11 lying within the notch 4, with its greatest diameter in the plane of the blade. In the present instance the fruit is placed upon the conveyer by hand, and is positioned, preferably stem down, with its exterior groove in the plane of the conveyer blades; that is, the operator, in forcing the fruit down upon the conveyer blade, causes said blade to enter the fruit in the plane of its exterior groove, thus positioning the fruit so that the greatest diameter of its pit is in the plane of said blade.

It should be noted that the position of the fruit upon the blades 3 of the conveyer 1 is entirely independent of the exterior conformation of said fruit, except in so far as the exterior groove is used as a guide to locate the plane of greatest diameter of the pit. The flesh of the fruit, however, may be asymmetrical, in which case one side will project farther from the conveyer blade 3 than the other.

The frame 9 supports a continuously rotating shaft 12, Figs. 1 and 4, upon which is mounted a knife or saw 13, adapted, in the present instance, to bisect both the flesh and the pit of the fruit. Said knife 13 lies in the same vertical plane as the blades 3 of the conveyer 1, as shown in Fig. 4. The frame 9 also supports a second horizontal rotatable shaft 14, Figs. 1 and 4, upon which is fixed a pair of spaced spiders 15, each having a series of radially projecting arms 16 in which are mounted laterally slidable members 17, the slidable members of one spider being in horizontal alignment with those of the other spider.

The inner or adjacent ends of the slidable members 17 are provided with fruit holding cups 18, and said members are normally moved toward each other, to cause the cups 18 to engage and hold between them a fruit 10, by springs 19. Pins 20, Figs. 2 and 4, limit the inward movement of the members 17 to prevent the cups 18 from meeting and thus being carried into the path of the knife 13.

The cups 18 are adapted to carry the fruit from the feed conveyer 1 to the bisecting knife 13, and thence to the usual devices for removing the pits. These latter devices form no part of the present invention, and have, therefore, been omitted from the drawings. For the purposes of this specification, it is sufficient to consider that the fruit, after being bisected by the knife 13, is conveyed by the cups 18 to any suitable subsequent operation.

In order to present the fruit properly to the knife 13, i. e. so that it will be cut by said knife in the plane of greatest diameter of the pit, said fruit must be kept in the same vertical plane during its transfer from the conveyer 1 to the knife 13, for said fruit has already been properly positioned in said plane by the operator when placing it upon said conveyer as described above. The mechanism for maintaining the fruit in the above mentioned plane during its transfer from the conveyer 1 to the knife 13 will now be described.

The slidable members 17 are provided at their outer ends with collars 21, Figs. 1 and 4, which engage and ride upon fixed cams 22 carried by the frame 9. By means of these cams 22, the slidable members 17 are drawn apart, to separate the cups 18, during the lower portion of their circular travel. Said cams terminate at such a point that the cups 18 are permitted to close upon the fruit held by one of the conveyer blades 3 at the position A. The continued upward movement of said cups then carries said fruit away from said conveyer blade 3, and eventually presents it to the knife 13 at the position B. Immediately after the cups 18 have closed upon the fruit at the position A, and before said fruit is lifted out of engagement with the conveyer blade 3, the slidable members 17 carrying said cups 18 are clamped in their holding arms 16 by means of levers 23, one associated with each such arm 16, as shown in Figs. 1, 2 and 4. Said levers 23 are pivotally mounted at 24 upon the arms 16, and, operating through slots in the outer ends of said arms, are adapted to bear against and clamp the slidable members 17, thus preventing any lateral movement of the latter. The levers 23 are operated by stationary cams 25, within which the upturned ends of said levers travel. This clamping action of the levers 23 takes place, as before stated, after the sliding members 17 have been freed from the cams 22 and the springs 19 have caused the cups 18 to engage the fruit at the position A, but before said fruit has been freed from the conveyer blade 3, and continues until said fruit has been halved by the knife 13. The fruit is therefore held, in the same vertical plane in which it was placed upon the conveyer blade 3, during its transfer from said conveyer blade to the knife 13.

The plane in which the fruit is held during this transfer is independent of its exterior conformation. If the fruit is symmetrical with respect to its pit, as shown at the position A in Fig. 4, both slidable members 17, when freed from the cams 22, will be moved inwardly the same amount by their springs 19, whereas if the flesh of the fruit is asymmetrical, as shown at the position B, one slidable member 17 will be moved inwardly farther than the other, but in both cases said slidable members 17 will be clamped, by the levers 23 and the cams 25, in the positions in which they come to rest when their cups 18 engage the fruit while the latter is still held by the conveyer blade 3, so that if said fruit has been properly placed upon said conveyer blade in the beginning, that is with the greatest diameter of its pit lying in the plane of said blade, it will be maintained in this plane after being removed from said blade, and will be so presented to the knife 13 as to cause it to be halved in the said plane of greatest pit diameter.

It is to be understood that the conveyer 1 and the shaft 14 are driven in the proper timed relation by any suitable means not shown in the drawings, so that as each fruit 10 is brought to the position A by said conveyer, it is engaged and removed therefrom by the cups 18 and advanced to the halving knife 13. Said knife 13 is understood to be continuously rotated by any suitable means, a pulley 26 being shown mounted upon the shaft 12 for this purpose.

I claim:—

1. A feed device for fruit pitters comprising a traveling member to releasably hold the fruit, regardless of its symmetry by an engagement adapted for a predetermined positioning of the pit relatively to the cutting member of the machine; means for grasping the fruit and removing it from the holding member without change of the relative position of the pit; and means for effecting the travel of the grasping means in a path adapted to present the fruit to the cutting member with its pit in the initial predetermined relative position.

2. A feed device for fruit pitters comprising a traveling impaling member to receive and releasably hold the fruit with its pit in a predetermined position relatively to the cutting member of the machine; means for grasping the impaled fruit and removing it without changing the relative position of the pit; and means for effecting the travel of the grasping means in a path adapted to present the fruit to the cutting member with its pit in the initial predetermined position.

3. A feed device for fruit pitters comprising a conveyer; a blade carried by said conveyer adapted to impale the fruit and releasably hold it with its pit in a predetermined position relatively to the cutting member of the machine; traveling cup members for exteriorly grasping the fruit and removing it from the blade without changing the relative position of the pit; and means for locking said cup members against movement tending to alter the position of the pit during the approach of the fruit and its presentation to the cutting member of the machine.

4. A feed device for fruit pitters comprising a traveling member to releasably hold the fruit, regardless of its symmetry, by an engagement adapted for a predetermined positioning of the pit relatively to the cutting member of the machine; traveling cup members for exteriorly grasping the fruit and removing it from the holding member without changing the relative position of the pit; and means for locking said cup members against movement tending to alter the position of the pit during the approach of the fruit and its presentation to the cutting member of the machine.

5. A feed device for fruit pitters comprising a conveyer; a notched blade carried by said conveyer adapted to impale the fruit and releasably hold it with its pit in the notch of said blade in a predetermined position relatively to the cutting member of the machine; means for grasping the impaled fruit and removing it from said blade without changing the relative position of the pit; and means for effecting the travel of the grasping means in a path adapted to present the fruit to the cutting member with its pit in the initial predetermined position.

6. A feed device for fruit pitters, comprising a conveyer to releasably hold the fruit, regardless of its symmetry, by an engagement adapted to position the pit in the plane of the cutting member of the machine; means for removing the fruit from said conveyer and presenting it to the cutting member; and means for preventing any movement of the fruit except in the plane of the cutting member during its transfer thereto from said conveyer.

7. A feed device for fruit pitters comprising a conveyer to releasably hold the fruit, regardless of its symmetry, by an engagement adapted to position the pit in the plane of the cutting member of the machine; means for exteriorly grasping the fruit, removing it from said conveyer, and presenting it to the cutting member; and means for preventing any transverse movement of said grasping means relatively to the plane of the cutting member, during the transfer of the fruit from said conveyer to said cutting member.

8. A feed device for fruit pitters comprising a conveyer to releasably hold the fruit, regardless of its symmetry, by an engagement adapted to position the pit in the plane of the cutting member of the machine; traveling cup members for exteriorly grasping the fruit, removing it from said conveyer, and presenting it to the cutting member; and means for locking said cup members against any transverse movement relative to the plane of the cutting member during the transfer of the fruit from said conveyer to said cutting member.

9. A feed device for fruit pitters comprising a conveyer to releasably hold the fruit, regardless of its symmetry, by an engagement adapted to position the pit in the plane of the cutting member of the machine; a pair of traveling cup members for transferring the fruit from said conveyer to the cutting member; means for moving said cup members laterally to cause them to exteriorly engage the sides of the fruit while the latter is held by said conveyer; and means for locking said cup members against any further lateral movement during the transfer of the fruit from said conveyer to the cutting member.

10. A feed device for fruit pitters comprising a conveyer to releasably hold the fruit, regardless of its symmetry, by an engagement adapted to position the pit in the plane of the cutting member of the machine; a pair of spaced traveling members for transferring the fruit from said conveyer to the cutting member; a cup member carried by and laterally movable in each traveling member; means controlled by the movement of said traveling members for moving said cup members toward each other to cause them to grasp the fruit while the latter is held by said conveyer; and means for preventing any further lateral movement of said cup members during the transfer of the fruit from said conveyer to the cutting member.

11. A feed device for fruit pitters comprising a conveyer to releasably hold the fruit, regardless of its symmetry, by an engagement adapted to position the pit in the plane of the cutting member of the machine; a pair of spaced traveling members for transferring the fruit from said conveyer to the cutting member; a cup member carried by and laterally movable in each traveling member; means controlled by the movement of said traveling members for moving said cup members toward each other to cause them to grasp the fruit while the latter is held by said conveyer; and locking devices actuated by the movement of the traveling members for preventing any further lateral movement of said cup members during the transfer of the fruit from said conveyer to the cutting member.

12. A feed device for fruit pitters comprising a conveyer to releasably hold the fruit, regardless of its symmetry, by an engagement adapted to position the pit in the plane of the cutting member of the machine; a pair of spaced traveling members for transferring the fruit from said conveyer to the cutting member; a cup member carried by and laterally movable in each traveling member; means controlled by the movement of said traveling members for moving said cup members toward each other to cause them to grasp the fruit while the latter is held by said conveyer; and clamps associated with said traveling members for locking said cup members in their fruit-grasping positions.

13. A feed device for fruit pitters comprising a conveyer to releasably hold the fruit, regardless of its symmetry, by an engagement adapted to position the pit in the plane of the cutting member of the machine; a pair of spaced traveling members for transferring the fruit from said conveyer to the cutting member; a cup member carried by and laterally movable in each traveling member; means controlled by the movement of said traveling members for moving said cup members toward each other to cause them to grasp the fruit while the latter is held by said conveyer; clamps associated with said traveling members for locking said cup members in their fruit-grasping position; and stationary cams for actuating said clamps.

14. A feed device for fruit pitters having a cutting member, comprising a conveyer; a blade carried thereby in the plane of said cutting member adapted to impale and releasably hold the fruit; and means for removing the impaled fruit and presenting it to the cutting member.

15. A feed device for fruit pitters having a cutting member, comprising a conveyer; a blade carried thereby and adapted to impale and releasably hold the fruit; and means for removing the impaled fruit from said blade and presenting it to said cutting member.

16. A feed device for fruit pitters having a cutting member, comprising a conveyer; a notched blade carried thereby and adapted to impale and releasably hold the fruit with its pit lying in the notch of said blade; and means for removing the fruit from said blade and presenting it to said cutting member.

17. A feed device for fruit pitters having a cutting member comprising a conveyer; a notched blade carried thereby in the plane of said cutting member adapted to impale and releasably hold the fruit with its pit lying in the notch of said blade, and means for transferring the fruit, in the same plane, from said impaling blade to the cutting member.

18. A feed device for fruit pitters having a cutting member comprising a conveyer; a series of blades carried thereby, each adapted to impale and releasably hold a fruit; a rotating member for transferring the fruit from said conveyer to said cutting member, a series of oppositely disposed cup members carried by the rotating member; means controlled by the rotation of said member for moving said cup members together to cause them successively to grasp the fruit and remove it from said conveyer; and means for operating said conveyer and said rotary member in timed relation.

19. A feed device for fruit pitters having a cutting member comprising a conveyer; a series of fruit holding members carried thereby; a rotating member for transferring the fruit from said conveyer to said cutting member; a series of oppositely disposed cup members carried by the rotating member and laterally movable thereupon; means for moving said cup members together to cause them successively to grasp the fruit and remove it from said conveyer; devices actuated by the movement of said rotating member for preventing any further lateral movement of said cup members during the transfer of the fruit from said conveyer to the cutting member; and means for operating the conveyer and the rotating member in timed relation.

In testimony whereof I have signed my name to this specification.

ALBERT R. THOMPSON.